UNITED STATES PATENT OFFICE.

MORGAN R. YEWELL, OF BARDSTOWN, KENTUCKY.

IMPROVEMENT IN REMEDIES FOR HOG CHOLERA.

Specification forming part of Letters Patent No. 182,542, dated September 26, 1876; application filed April 3, 1876.

*To all whom it may concern:*

Be it known that I, MORGAN R. YEWELL, of Bardstown, in the county of Nelson and State of Kentucky, have invented a certain new and useful Invention or Compound for the Prevention and Cure of Hog Cholera; and I do hereby declare that the following is a full, clear, and exact description thereof, which will enable others skilled in the art to make and use the same.

This invention relates to a certain new and useful compound for the prevention and cure of hog cholera, consisting in a composition formed by mixing bicarbonate of soda, bicarbonate of potash, soda-phosphate, and carbon, or pulverized charcoal, in the several proportions herein described, viz: Bicarbonate of soda, one pound; bicarbonate of potash, one-quarter pound; soda-phosphate, one pound; pulverized charcoal, one-quarter pound.

To prepare this, my compound, I take these several ingredients, and when thoroughly pulverized, I mix them together in a dry state, and at each feeding-time mix a sufficient portion of it with their ordinary food, or as much thereof as the nature of the disease may require at that time; but the quantity must, in all cases, be regulated according to the severity or stage of the disease when given; and in order to prevent a return of the disease while in a weak state, or otherwise, I use an additional compound consisting of common salt, and the scales and ashes from a blacksmith's forge, mixed together in equal parts, and given to the animals as often as they require salting, and in such quantities as they will readily consume.

Having thus fully described the nature and object of this, my invention, therefore I claim as my invention—

For the cure of hog cholera, a compound consisting of bicarbonate of soda, bicarbonate of potash, soda-phosphate, and pulverized charcoal, salt, and the scales and ashes from a blacksmith's forge, as a preventative, substantially as and for the purpose hereinbefore specified.

MORGAN R. YEWELL.

Witnesses:
FRANK PARDON,
W. W. DAWSON.